(12) United States Patent
Suzuki (10) Patent No.: US 8,256,557 B2
(45) Date of Patent: Sep. 4, 2012

(54) CANISTER MOUNTING STRUCTURE FOR A SADDLE-TYPE VEHICLE, AND VEHICLE INCORPORATING SAME

(75) Inventor: Shota Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 12/712,511

(22) Filed: Feb. 25, 2010

(65) Prior Publication Data

US 2010/0243358 A1 Sep. 30, 2010

(30) Foreign Application Priority Data

Mar. 31, 2009 (JP) ................... 2009-087780

(51) Int. Cl.
*B62D 61/02* (2006.01)
(52) U.S. Cl. ........................ 180/219; 280/833
(58) Field of Classification Search .................. 180/219, 180/68.3, 225; 280/833
See application file for complete search history.

(56) References Cited

U.S. PATENT DOCUMENTS

| | | | | |
|---|---|---|---|---|
| 5,687,697 A * | 11/1997 | Ishikawa | ........................ | 123/520 |
| 8,113,312 B2 * | 2/2012 | Seki et al. | ..................... | 180/225 |
| 2010/0078241 A1 * | 4/2010 | Maeda et al. | ................ | 180/68.3 |
| 2011/0073399 A1 * | 3/2011 | Seki | .............................. | 180/219 |
| 2011/0120796 A1 * | 5/2011 | Kuramochi et al. | .......... | 180/219 |
| 2011/0308874 A1 * | 12/2011 | Tanaka | .......................... | 180/219 |

FOREIGN PATENT DOCUMENTS

JP P3334239 8/2002

* cited by examiner

*Primary Examiner* — Tashiana Adams
(74) *Attorney, Agent, or Firm* — Carrier Blackman & Associates, P.C.; William D. Blackman; Joseph P. Carrier (57) ABSTRACT

A saddle-type vehicle includes a canister mounting structure. The vehicle includes a vehicle body frame, an engine fastened to the vehicle body frame, an exhaust pipe connected to the engine, a fuel tank mounted on the vehicle body frame, a canister for storing gasoline vapors form the fuel tank and a purge control valve for controlling purge of the canister. The canister mounting structure includes a canister holder having a first mounting portion for mounting the canister, and a second mounting portion for mounting the purge control valve therein. The canister holder is disposed adjacent the exhaust pipe. The canister holder is formed so as to cover sides of the canister and a side of the canister adjacent the exhaust pipe. Such configuration of the canister mounting structure provides heat-shielding measures for the canister, and achieves a desired ease of assembly.

20 Claims, 9 Drawing Sheets

CANISTER MOUNTING STRUCTURE FOR A SADDLE-TYPE VEHICLE, AND VEHICLE INCORPORATING SAME

CROSS-REFERENCE TO RELATED APPLICATIONS

The present invention claims priority under 35 USC 119 based on Japanese patent application No. 2009-087780, filed on Mar. 31, 2009. The entire subject matter of this priority document, including specification claims and drawings thereof, is incorporated by reference herein.

BACKGROUND OF THE INVENTION

1. Field of the Invention

The present invention relates to a canister mounting structure for a saddle-type vehicle, and a vehicle incorporating the same. More particularly, the present invention relates to a canister mounting structure having a canister holder which provides both heat-shielding measures for a canister, and easy assembly of the canister in the canister holder, and to a vehicle incorporating the same.

2. Description of the Background Art

There is a known saddle-type motorcycle, which includes a canister mounting structure. The canister mounting structure allows sub-assembling of a canister and a roll over valve together on a canister frame. The canister frame includes a tube welded to a plate canister holder.

An example of such canister mounting structure is disclosed in the Japanese Patent Document No. 3334239. The mounting structure disclosed in the Japanese Patent Document No. 3334239 allows a fuel system around the canister to be assembled in one pass in a completed vehicle assembly line.

A heat measure may have to be taken if the canister is to be disposed near an exhaust pipe. However, the Japanese Patent Document No. 3334239 does not disclose a structure that achieves both heat measures and subassembly of the canister.

The present invention has been made to overcome such drawbacks of the existing canister mounting structure. Accordingly, it is one of the objects of the present invention to provide a canister mounting structure for a saddle-type vehicle that can achieve both good ease of assembly and canister heat-shielding measures.

SUMMARY OF THE INVENTION

In order to achieve the above objects, the present invention according to a first aspect thereof provides a canister mounting structure for a saddle-type vehicle. The saddle-type vehicle includes a vehicle body frame; an engine fastened to the vehicle body frame; an exhaust pipe connected to the engine; a fuel tank mounted on the vehicle body frame; a canister for storing gasoline vapors from the fuel tank; a purge control valve for controlling purge of the canister; and a canister holder including a first mounting portion for mounting the canister, and a second mounting portion for mounting the purge control valve therein.

Herein, the canister holder is disposed adjacent the exhaust pipe and formed so as to cover (surround) sides of the canister and a side of the canister adjacent the exhaust pipe.

According to the canister mounting structure for the saddle-type vehicle of the present invention, the canister holder having the canister and the purge control valve disposed therein such that the canister holder covers the exhaust pipe. Therefore, subassembly of the canister and the purge control valve and heat-shielding of the canister can both be easily achieved.

The present invention according to a second aspect thereof, in addition to the first aspect, is characterized in that the canister holder includes a heat-shielding member formed from one of (or both of) a resin containing glass fiber and carbon fiber. The first and second mounting portions of the canister holder are integrally formed therewith. The first mounting portion for the canister holder includes two catches (provided at end portion thereof) for engaging a canister-fixing band (end portion of the canister-fixing band). In the canister mounting structure of the present invention, the canister holder is applied as a heat-shielding cover.

According to the canister mounting structure of the present invention, the canister holder is a one-piece molding formed from a resin, and is integrated with the two catches. Such configuration of the canister holder helps to reduce the number of components used for mounting the canister, which contributes to a reduced product cost.

The present invention according to a third aspect thereof, in addition to the second aspect, is characterized in that the heat-shielding cover (canister holder) includes an engagement portion at a front portion thereof having a mounting hole formed therein; and a protrusion disposed at a rear portion thereof. The engagement portion is operatively attached to the exhaust pipe or with cylinder of the engine. The protrusion of the heat-shielding cover is engaged with the vehicle body frame.

According to the canister mounting structure for the saddle-type vehicle of the present invention, after the protrusion of the heat-shielding cover is engaged with the vehicle body frame, the front portion of the heat-shielding cover is fixed, via the mounting hole, with for example, the rear cylinder or the rear cylinder exhaust pipe. The rear portion of the heat-shielding cover is fixes in place only through engagement of the protrusion. Such arrangement eliminates the need for fasteners.

The present invention according to a fourth aspect thereof, in addition to the second aspect, is characterized in that the heat-shielding cover includes left and right side-engaging portions, each having a hole formed therein, through which a respective one of pawl portions extended inwardly in a vehicle width direction is passed from respective cover members arranged on sides of the heat-shielding cover.

According to the canister mounting structure for the saddle-type vehicle of the present invention, the heat-shielding cover is accommodated such that the heat-shielding cover is sandwiched in a space between the cover members on both sides on the vehicle body side. In addition, the pawl portions extended from the cover members on both sides are passed through the side-engaging portions. These arrangements restrict lateral and vertical movements of the canister holder.

EFFECTS OF THE INVENTION

According to the canister mounting structure of the first aspect of the present invention, the canister holder not only allows the canister and the purge control valve to be subassembled together, but also serves as a heat-shielding part for the canister.

According to the canister mounting structure of the second aspect of the present invention, cost reduction can be achieved for the canister holder capable of shielding heat.

According to the canister mounting structure of the third aspect of the present invention, the canister subassembly can be easily put together, and tightening parts can be eliminated for positioning and fixing the rear portion of heat-shielding cover (canister holder) on the vehicle body frame.

According to the canister mounting structure of the fourth aspect of the present invention, lateral oscillation of the canister holder can be suppressed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In FIGS. 1-9, the terms Fr, Rr, L, R, U and D, are used in reference to a vantage point of an operator of the vehicle, seated on the driver's seat and facing forward, and represent front, rear, left, right, up and down directions, respectively.

Figure 1:
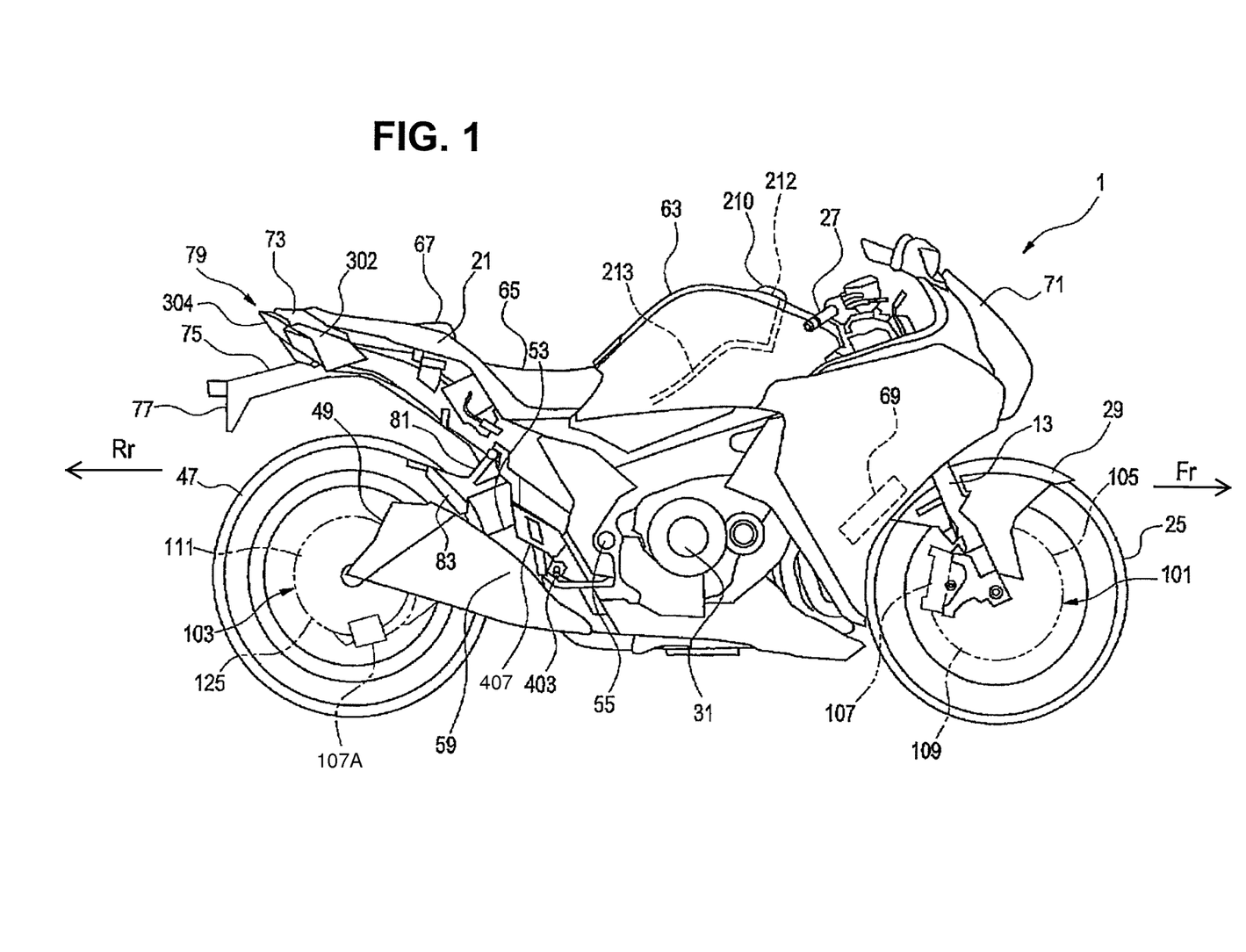
FIG. 1 is a side elevational view showing basic arrangements of a motorcycle according to an embodiment of the present invention.
Figure 2:
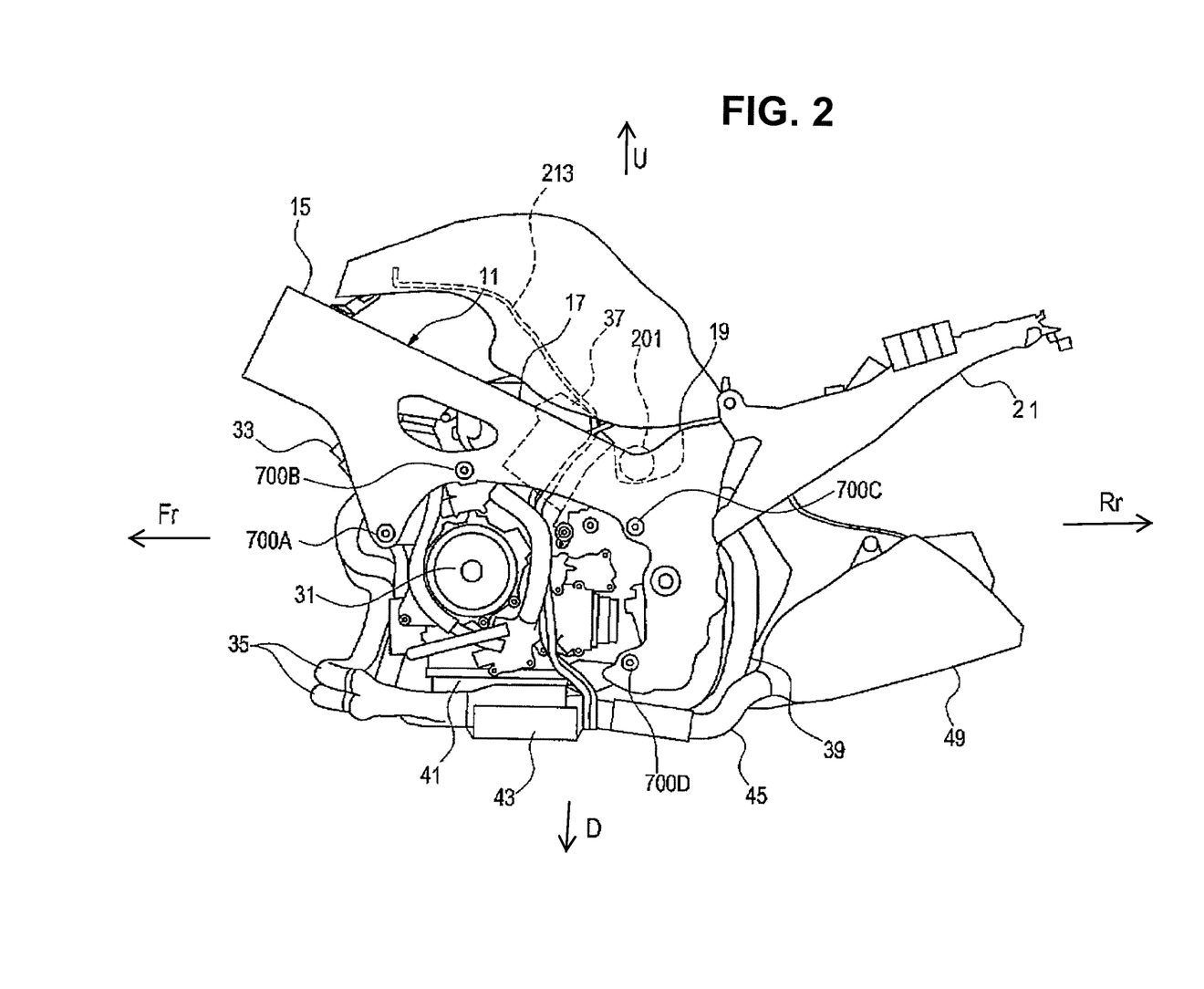
FIG. 2 is a left side elevational view showing a vehicle body.

FIG. 1 is a side elevational view showing basic arrangements of a motorcycle according to an embodiment of the present invention. FIG. 2 is a left side elevational view showing a vehicle body.

A motorcycle 1 includes a vehicle body frame 11. The vehicle body frame 11 includes a head pipe 15, a pair of left and right main frames 17, a pair of left and right intermediate frames 19, and a pair of left and right seat rails 21. The head pipe 15 steerably supports a front fork 13. The main frames 17 extend downwardly toward the rear from the head pipe 15. The intermediate frames 19 are connected to rear ends of the main frames 17 and extend substantially vertically. The seat rails 21 extend upwardly toward the rear from upper portions of the intermediate frames 19.

A front wheel 25 is rotatably journaled on a lower end of the front fork 13. A handlebar 27 is connected to an upper end of the front fork 13. A front fender 29 that covers upwardly of the front wheel 25 is supported by the front fork 13.

Disc brakes 101, 103, as shown in FIG. 1, are mounted on the front wheel 25 and a rear wheel 47, respectively. The disc brake 101 for the front wheel 25, for example, includes a brake disc 105 and a caliper 107. The disc brake 103 for the rear wheel 47, for example, includes a brake disc 111 and a caliper 107A. The brake disc 105 is fixed to, and integrally rotatable with, the front wheel 25. The caliper 107 is mounted on the front fork 13. The caliper 107 has a pair of left and right friction pads built therein. The friction pads move away from each other via a piston (not shown) by a hydraulic pressure generated by a master cylinder (not shown). The friction pads clampingly press braking surfaces 109, 125 on both sides of the brake discs 105, 111 to thereby give the front wheel 25 and the rear wheel 47 a braking force.

As shown in FIG. 2, a water-cooled, four-cylinder V-engine 31 is suspended on the main frames 17 and the intermediate frames 19 so as to be supported by a first support portion 700A, a second support portion 700B, a third support portion 700C, and a fourth support portion 700D. A front cylinder exhaust pipe 35 extends forwardly from a front cylinder 33 of the engine 31. A rear cylinder exhaust pipe 39 extends rearwardly from a rear cylinder 37 of the engine 31, and then extends forwardly and again rearwardly. The front cylinder exhaust pipe 35 and the rear cylinder exhaust pipe 39 extend downwardly along a front surface of a crankcase 41 of the engine 31 and are disposed downwardly of the crankcase 41 via a catalytic chamber (CAT chamber) 43.

The catalytic chamber 43 is connected to a rearward manifold 45 via a manifold (described later). The rearward manifold 45 is disposed in a space formed between a lower portion of the crankcase 41 and the rear wheel 47. The rearward manifold 45 is connected to a muffler 49, which extends to the right side of the vehicle body relative to the rear wheel 47. The rearward manifold 45 is arranged downwardly of the crankcase 41.

The muffler 49 is disposed crosswise, when viewed in a side view, relative to a swing arm 53 having a rear end portion for supporting the rear wheel 47. The swing arm 53 includes a front end portion that is vertically swingably supported at a lower portion of the muffler 49 by a pivot shaft 55 and suspended by a rear cushion 57 disposed between the front end portion and an upper end portion of a pivot plate 51. A step holder 407 having an occupant step 403 is disposed between the front wheel 25 and the rear wheel 47.

An output from the engine 31 is transmitted to the rear wheel 47 via a drive shaft 59. The drive shaft 59 is built into the swing arm 53 disposed on the left side of the engine 31, looking a forward direction Fr of the motorcycle 1.

A fuel tank 63 supported on the main frames 17 is arranged upwardly of the engine 31. A riding seat (main seat) 65 on which a rider sits is arranged rearward of the fuel tank 63 so as to be supported by the seat rails 21. In addition, a pillion seat 67 as a riding seat on which a passenger sits is disposed rearwardly of the main seat 65.

A canister 201 is disposed downwardly of a rear portion of the fuel tank 63. The canister 201 is configured to capture volatile gasoline vapors in the fuel tank 63 and prevents the gasoline vapors from escaping to the outside. As shown in FIG. 1, the fuel tank 63 includes a lid 210, a fuel filler port 212, and a purge pipe 213.

A radiator 69 is arranged in front of the engine 31. A front cowl 71, formed from a synthetic resin, covers the vehicle body frame 11 forwardly of the head pipe 15. In addition, lower side cowls (not shown) continuous with the front cowl 71 cover from both sides a front portion of the main frames 17, the radiator 69, and a front portion and a lower portion of the engine 31.

A rear cowl 73 and a rear fender 75 are mounted on a rear portion of the vehicle body frame 11. The rear cowl 73 covers the rear portion of the vehicle body frame 11. The rear fender 75 is disposed rearwardly of the rear cowl 73, covering the rear wheel 47 from an upward direction. In addition, the rear fender 75 includes a pair of left and right plate attaching portions 77 on which a license plate (not shown) can be attached.

A rear combination lamp 79 is disposed inside the rear cowl 73. The rear combination lamp 79 integrates a pair of left and right emergency flashers 302, and tail and stop lamps 304 that serve as bulbs of the left and right flashers 302. The rear combination lamp 79 is disposed such that a rear portion thereof faces rearwardly from a rear end of the rear cowl 73. As shown in FIG. 1, the motorcycle 1 includes pillion step holders 81 and pillion steps 83 disposed on both lateral sides of the vehicle body.

Figure 3:
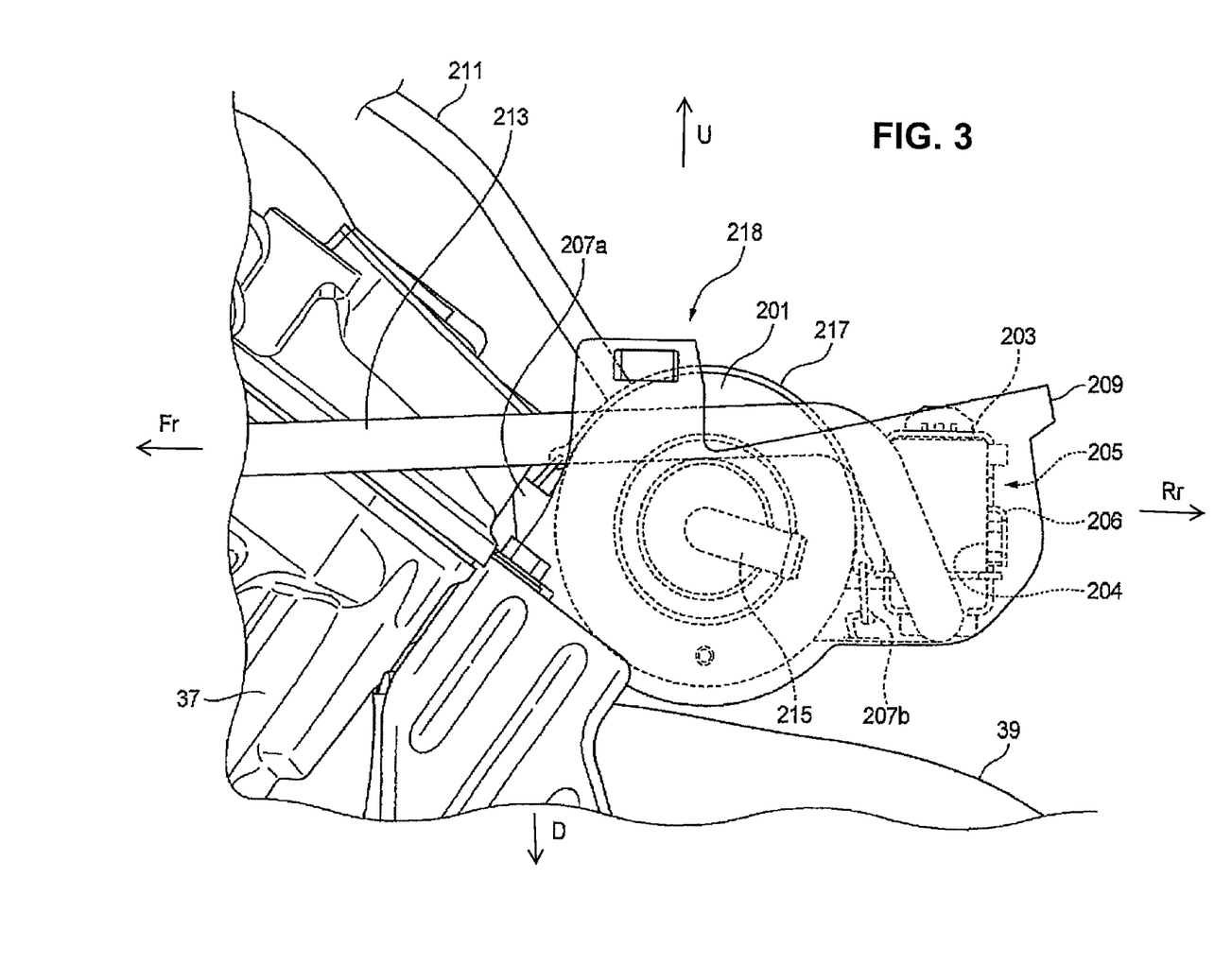
FIG. 3 is a left side elevational view showing a canister holder.
Figure 4:
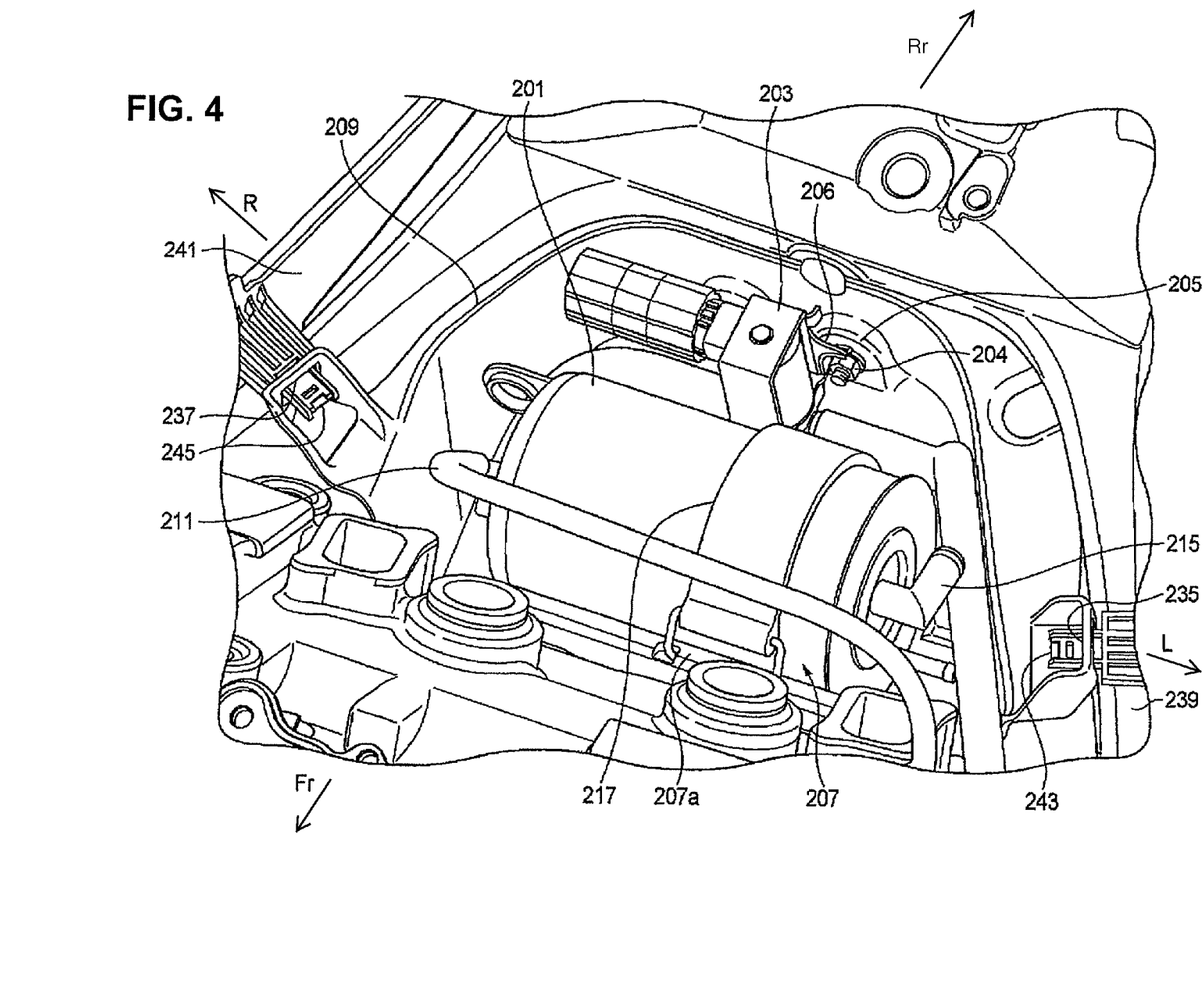
FIG. 4 is a perspective view showing the canister holder having a canister mounted therein, as viewed from a left forward and upward direction of the vehicle.
Figure 5:
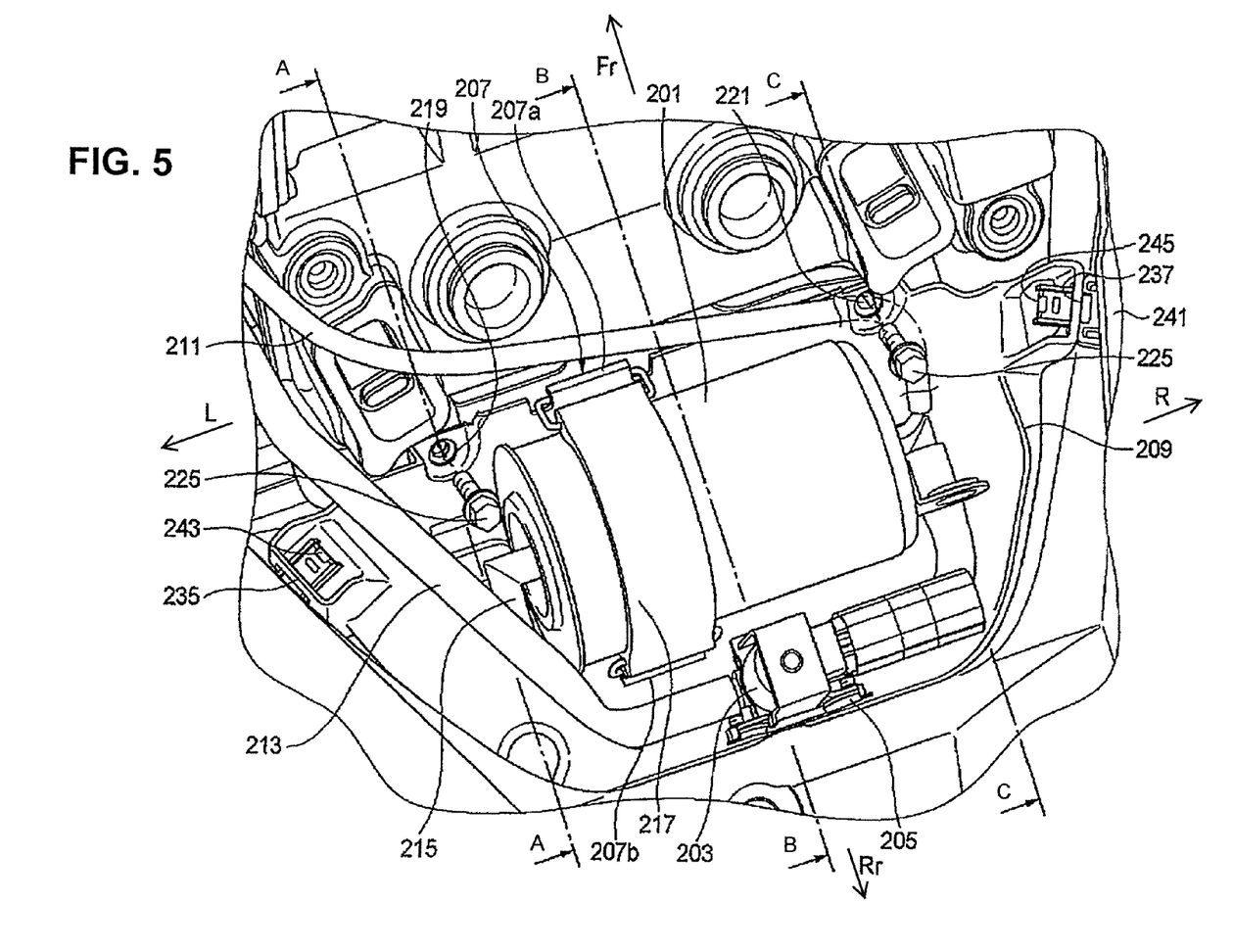
FIG. 5 is a perspective view showing the canister holder shown in FIG. 4, as viewed from a left rearward and upward direction of the vehicle.
Figure 6:
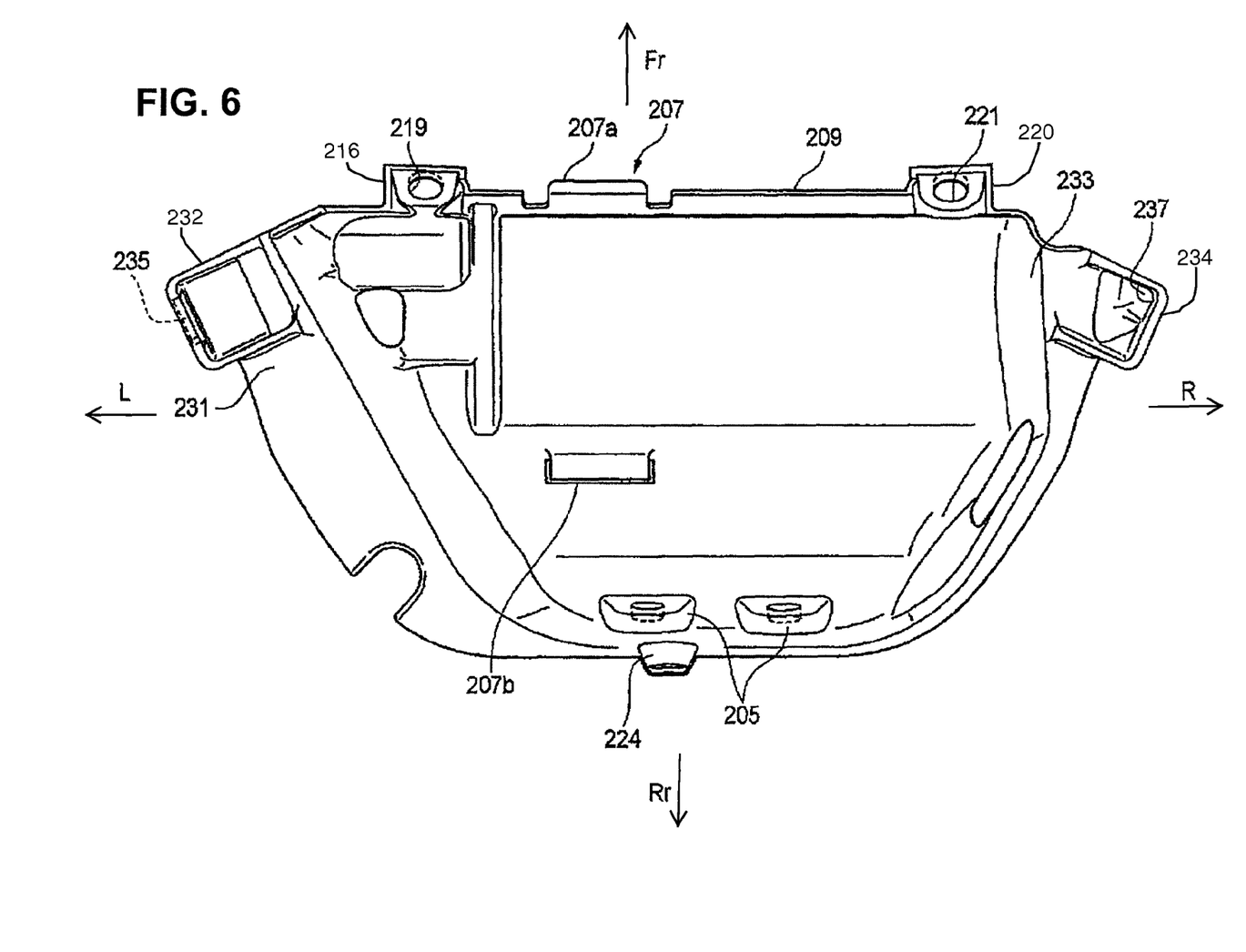
FIG. 6 is a plan view showing the canister holder.
Figure 7:
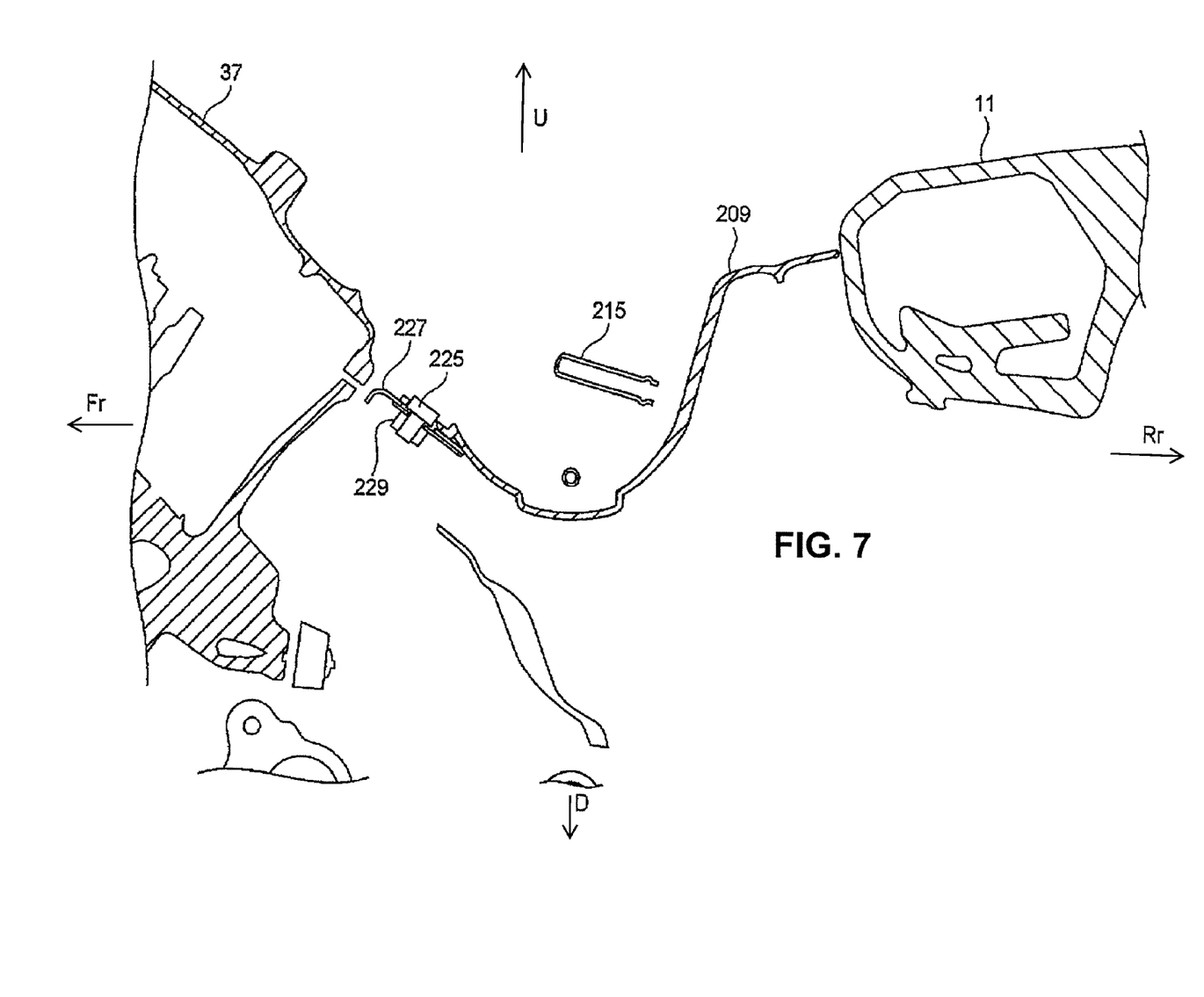
FIG. 7 is a cross-sectional view taken along line A-A of FIG. 5.
Figure 8:
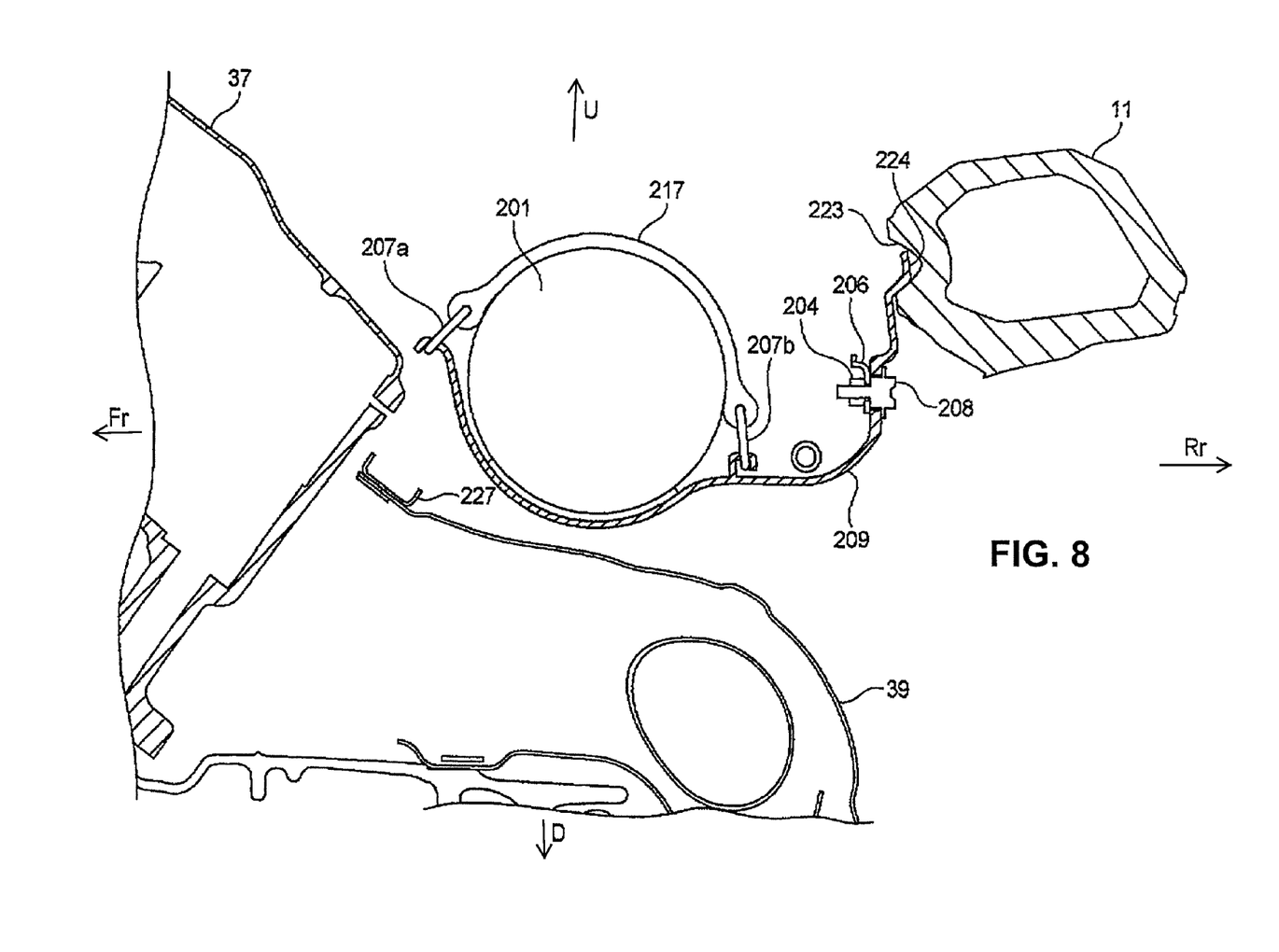
FIG. 8 is a cross-sectional view taken along line B-B of FIG. 5.
Figure 9:
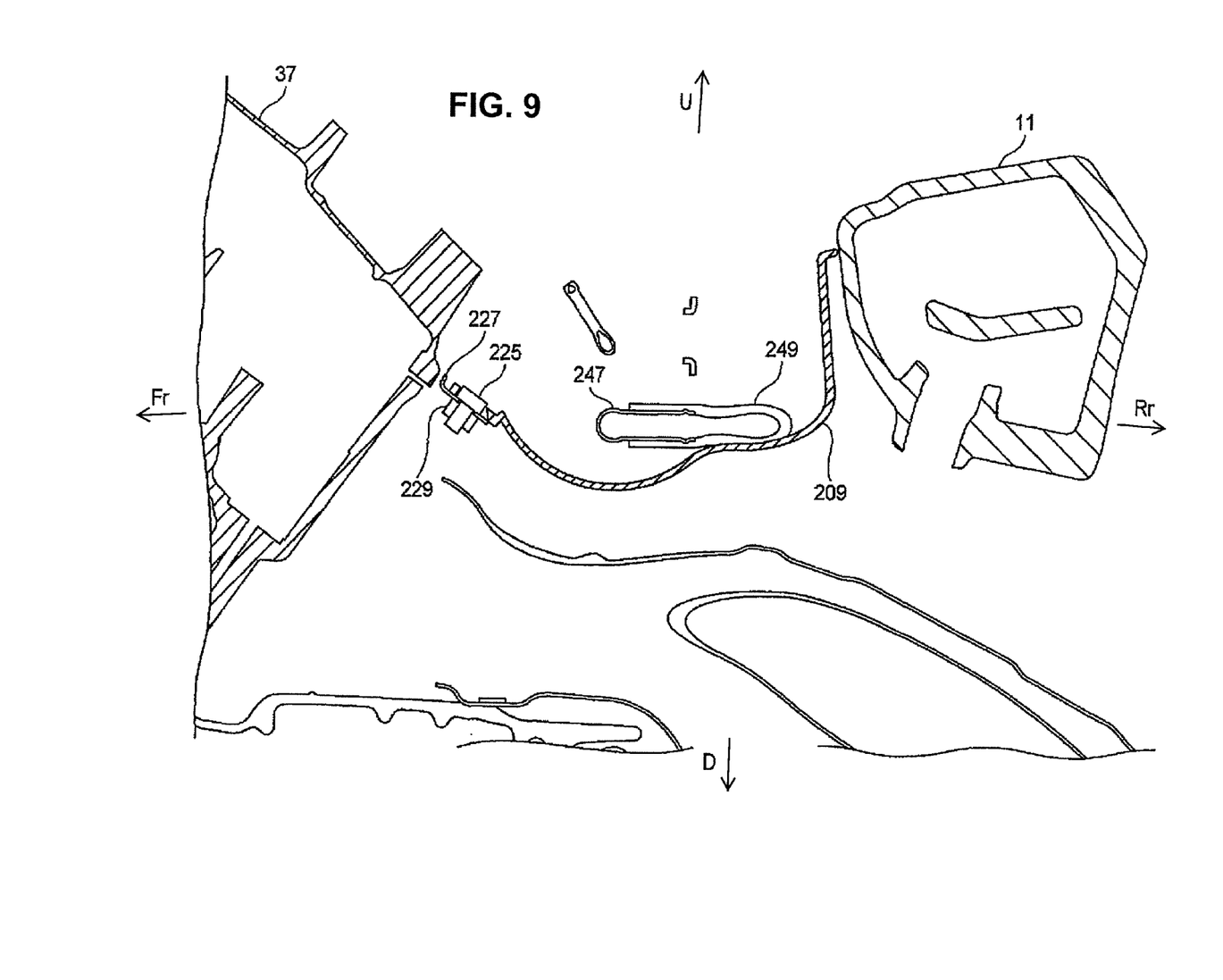
FIG. 9 is a cross-sectional view taken along line C-C of FIG. 5.

FIG. 3 is a left side elevational view showing a canister holder 209. FIG. 4 is a perspective view showing the canister holder 209 in which the canister 201 is mounted, as viewed from a left forward and upward direction of the vehicle. FIG. 5 is a perspective view showing the canister holder shown in FIG. 4, as viewed from a left rearward and upward direction of the vehicle. FIG. 6 is a plan view showing the canister holder. FIG. 7 is a cross-sectional view taken along line A-A of FIG. 5. FIG. 8 is a cross-sectional view taken along line B-B of FIG. 5. FIG. 9 is a cross-sectional view taken along line C-C of FIG. 5.

The motorcycle 1 includes the engine 31 fastened to the vehicle body frame 11, the rear cylinder exhaust pipe 39 for the rear cylinder 37 connected to the engine 31, the fuel tank 63 mounted on the vehicle body frame 11, and a canister holder 209 having the canister 201 disposed therein, the canister 201 being configured to store the gasoline vapors of the fuel tank 63, and a purge control valve 203 that controls purge of the canister 201. The canister holder 209 includes a first mounting portion 207 (207a, 207b) for mounting the canister 201, and a second mounting portion 205 for mounting the purge control valve 203 thereon.

The canister 201 has three pipes, i.e., a volatile gasoline vapor derivation pipe 211, the purge pipe 213, and a drain pipe 215 extending therefrom. The volatile gasoline vapor derivation pipe 211 is connected so as to be in communication with a space defined by the lid 210 and the fuel filler port 212 of the fuel tank 63. The purge pipe 213 is connected to an intake path of the engine 31. The drain pipe 215 is open to the atmosphere.

The volatile gasoline vapor generated in the fuel tank 63 while the motorcycle 1 is being parked flows through the volatile gasoline vapor derivation pipe 211 and is adsorbed onto activated charcoal of the canister 201 and accumulated in the canister 201.

When the engine 31 of the motorcycle 1 is operated and the motorcycle 1 enters in an operating state running at 30 to 100 km/h, an ECU (not shown) transmits a valve open signal to the purge control valve 203. The purge control valve 203 is thereby opened, so that vacuum generated in the intake path is transmitted into the canister 201 through the purge pipe 213. The vacuum transmitted into the canister 201 causes the volatile gasoline vapor accumulated in the canister 201 to be drawn into the intake path through the purge pipe 213. The volatile gasoline vapor is thereby fed to the engine 31 and burned with a mixture.

The canister holder 209 is disposed adjacent the rear cylinder exhaust pipe 39. The canister holder 209 is formed so as to cover sides of the canister 201 and a side thereof adjacent the rear cylinder exhaust pipe 39.

The canister holder 209 is formed into a tray-like shape having a center recessed to accommodate the canister 201 therein and peripheral walls to surround the canister 201 and the purge control valve 203. In addition, the canister holder 209 includes a heat-shielding member formed from one of a resin containing glass fiber and carbon fiber. The first mounting portion 207 for mounting the canister 201 is integrally formed, as the two catches 207a, 207b for engaging a canister-fixing band 217, with the canister holder 209.

In addition, the second mounting portion 205 for mounting the purge control valve 203 is disposed at the rear portion of the canister holder 209. The purge control valve 203 is fastened to the second mounting portion 205 included in the canister holder 209 with a bolt (see FIG. 8) tightened to a first stay member 206 with a weld nut 204 integrally disposed at the rear portion of the canister holder 209. The canister holder 209 formed from a resin one-piece molding integrated with the catches 207a, 207b helps reduce the number of parts used, contributing to a reduced product cost.

Accordingly, the canister holder 209 allows the canister 201 and the purge control valve 203 to be sub-assembled into a subassembly 218 (canister subassembly) shown in FIG. 3. Such configuration of the subassembly 218 shields the canister 201 from direct heat of the rear cylinder exhaust pipe 39 and the rear cylinder 37 at the same time.

Referring to FIG. 6, the canister holder 209 as a heat-shielding cover includes a pair of left and right engagement portions 216, 220 at a front portion thereof having respective mounting holes 219, 221 formed therein. The canister holder 209 further includes, at the rear portion thereof, a protrusion 224 for engaging with a recess 223 formed on the side of the vehicle body frame 11 (see FIG. 8). After the protrusion 224 is engaged with the recess 223 of the vehicle body frame 11, the front portion is fixed with bolts 225, 225 via the mounting holes 219, 221, which fixes the rear portion in place only through engagement of the protrusion 224. Such configuration of the canister holder 209 eliminates the need for fasteners.

Each of the bolts 225, 225 is threadably attached to a nut 229 fixed to a second stay member 227 disposed behind the front portion of the canister holder 209 shown in FIGS. 7 and 9. The second stay member 227 is fixed to, for example, the rear cylinder 37 or the rear cylinder exhaust pipe 39. In accordance with the illustrative embodiment of the present invention, as shown in FIG. 8, the second stay member 227 is fixed to the rear cylinder exhaust pipe 39.

Left and right side upper portions 231, 233 shown in FIG. 6 of the canister holder 209 include side-engaging portions 232, 234 having respective holes 235, 237, formed therein. Pawl portions 243, 245 extended inwardly in the vehicle width direction from cover members 239, 241 arranged on left and right sides of the canister holder 209, as shown in FIG. 4, are passed through the respective holes 235, 237 of the side-engaging portions 232, 234.

The canister holder 209 is accommodated such that the canister holder 209 is sandwiched in a space between the cover members 239, 241 on both sides on the vehicle body side. Further, the pawl portions 243, 245 extended from the cover members 239, 241 arranged on both sides of the canister holder 209 are passed through respective holes 235, 237 of the side-engaging portions 232, 234. These simple arrangements reliably restrict lateral and vertical movements of the canister holder 209.

Referring to FIG. 9, a purge control valve connection pipe 247 protrudes from the canister 201, and a connection tube 249 is connected with the purge control valve 203.

As described heretofore, according to the canister mounting structure of the illustrative embodiment of the present invention, the canister holder 209 not only allows the canister 201 and the purge control valve 203 to be sub-assembled together, but also serves as a heat-shielding part for the canister 201.

According to the canister mounting structure of the illustrative embodiment of the present invention, cost reduction can be achieved of the canister holder 209 capable of shielding heat.

According to the canister mounting structure of the embodiment of the present invention, the canister subassembly can be easily put together, and tightening parts can be eliminated for positioning and fixing the cover rear portion.

According to the canister mounting structure of the embodiment of the present invention, lateral oscillation of various components, including that of the canister holder, can be suppressed by adjoining parts.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A canister mounting structure for a saddle-type vehicle, the saddle-type vehicle comprising:
    a vehicle body frame;
    an engine fastened to the vehicle body frame;
    an exhaust pipe connected to the engine;
    a fuel tank mounted on the vehicle body frame;
    a canister for storing gasoline vapors from the fuel tank; and
    a purge control valve for controlling purge of the canister;
    said canister mounting structure comprising a canister holder comprising a first mounting portion for mounting the canister, and a second mounting portion for mounting the purge control valve therein;
    wherein the canister holder is disposed adjacent the exhaust pipe;
    and wherein the canister holder is configured and arranged such that, in an assembled state of the canister mounting structure, the canister holder covers a side of the canister adjacent the exhaust pipe.

2. The canister mounting structure according to claim 1, further comprising a canister-fixing band for securing the canister to the canister holder,
    wherein the canister holder includes a heat-shielding member comprising at least one of a resin containing glass fiber and carbon fiber;
    wherein in an assembled state thereof, the canister holder forms a heat-shielding cover for said canister;
    wherein the first mounting portion for mounting the canister is integrally formed with the heat-shielding cover; and
    wherein the first mounting portion comprises a pair of catches arranged on the heat-shielding cover for engaging the canister-fixing band.

3. The canister mounting structure according to claim 2, wherein the heat-shielding cover comprises an engagement portion situated at a front portion thereof and having a mounting hole formed therein, and a protrusion disposed at a rear portion thereof, said protrusion engaged with the vehicle body frame.

4. The canister mounting structure according to claim 2, further comprising a plurality of cover members each having a pawl portion extending inwardly in a vehicle width direction;
    wherein the heat-shielding cover includes a plurality of side-engaging portions formed at left and right side upper portions thereof, each of said side-engaging portions having an opening formed therein, and wherein each of said pawl portions is passed through a respective opening of the side-engaging portions.

5. A canister mounting structure according to claim 1, wherein said canister holder has a tray-like shape for accommodating the canister therein, and includes peripheral walls for surrounding the canister and the purge control valve.

6. A canister mounting structure according to claim 1, wherein said canister holder has a recessed portion formed in a central portion thereof for accommodating the canister, and includes interconnected peripheral walls for surrounding the canister and the purge control valve.

7. A canister mounting structure according to claim 1, wherein said canister holder is a one-piece molding formed from a heat-resistant plastic material, and is integrated with the first and second mounting portions.

8. A canister mounting structure according to claim 1, wherein said engine is a water-cooled, four-cylinder V-type engine having cylinders arranged at front and rear portions thereof, and wherein said exhaust pipe extends from the cylinders arranged at the rear portion of the engine.

9. A motorcycle comprising
    a vehicle body frame;
    a V-type engine fastened to the vehicle body frame, and having front and rear cylinders;
    an exhaust pipe extending from said rear cylinder of the engine;
    a fuel tank mounted on the vehicle body frame;
    a canister for storing gasoline vapors from the fuel tank;
    a purge control valve for controlling purge of the canister;
    a canister holder comprising a first mounting portion for mounting the canister, and a second mounting portion for mounting the purge control valve therein,
    wherein the canister holder is disposed adjacent the exhaust pipe; and
    wherein the canister holder is configured and arranged such that, in an assembled state thereof, said canister holder substantially surrounds the canister and substantially shields the canister from direct exposure to heat of said exhaust pipe.

10. A motorcycle according to claim 9, further comprising a canister-fixing band for securing the canister with the canister holder,
    wherein:
    the canister holder includes a heat-shielding member formed from one of the a resin containing glass fiber and carbon fiber;
    the first mounting portion for mounting the canister is integrally formed with the canister holder;
    the first mounting portion comprises a pair of catches arranged on the canister holder for engaging the canister-fixing band for securing the canister therewith.

11. A motorcycle according to claim 10, wherein the canister holder comprises an engagement portion at a front portion thereof having a mounting hole formed therein, and a protrusion formed at a rear portion thereof;

wherein said engagement portion is operatively attached to said rear cylinder; and wherein said protrusion of the canister holder is engaged with the vehicle body frame.

12. A motorcycle according to claim 10, further comprising a plurality of cover members, each having a pawl portion extending inwardly in a vehicle width direction;

wherein said canister holder includes a plurality of side-engaging portions formed at left and right side upper portions thereof, each of said side-engaging portions having an opening formed therein, and wherein each of said pawl portions is engaged a respective opening of one of the engaging portions of the canister holder.

13. A motorcycle according to claim 9, wherein said canister holder has a tray-like shape for accommodating the canister therein.

14. A motorcycle according to claim 1, wherein said canister holder is a one-piece molding formed from a heat-tolerant plastic material, and is integrally formed with the first and second mounting portions.

15. A saddle-type vehicle comprising
a vehicle body frame;
an engine supported by the vehicle body frame;
an exhaust pipe extending from said engine;
a fuel tank mounted on the vehicle body frame;
a canister for storing gasoline vapors from the fuel tank;
a purge control valve for controlling purge of the canister;
a canister holder comprising a first mounting portion for mounting the canister, and a second mounting portion for mounting the purge control valve therein,
wherein the canister holder is disposed adjacent the exhaust pipe; and
wherein the canister holder is formed such that, in an assembled state thereof, said canister holder surrounds sides of the canister thereby shielding the canister from heat of the exhaust pipe.

16. A saddle-type vehicle according to claim 15, further comprising a canister-fixing band for securing the canister to the canister holder, wherein the canister holder includes a heat-shielding member comprising a resin-containing glass fiber or a carbon fiber;

wherein the first mounting portion for mounting the canister on the canister holder is integrally formed with the canister holder;

and wherein the first mounting portion comprises a pair of catches arranged on the canister holder for engaging the canister-fixing band.

17. A saddle-type vehicle according to claim 15, wherein the second mounting portion is disposed at a rear portion of the canister holder; and wherein the purge control valve is fastened to the second mounting portion with a bolt.

18. A saddle-type vehicle according to claim 15, wherein said canister holder comprises an engagement portion situated at a front portion thereof and having a mounting hole formed therein, and a protrusion formed at a rear portion of the canister holder;

wherein said engagement portion is operatively attached to the exhaust pipe, and said protrusion is operatively attached to the vehicle body frame.

19. A saddle-type vehicle according to claim 15, further comprising a plurality of cover members, each having a pawl portion extending inwardly in a vehicle width direction;

wherein said canister holder includes a plurality of side-engaging portions formed at left and right side upper portions thereof, each of said side-engaging portions having an opening formed therein;

and wherein each of said pawl portions is engaged with the respective one of the openings of the engaging portions.

20. A saddle-type vehicle according to claim 15, wherein said canister holder is one-piece molding formed from material comprising resin, and wherein said canister holder is integrated with the said first and second mounting portions.

* * * * *